Patented Nov. 7, 1933

1,934,613

UNITED STATES PATENT OFFICE

1,934,613

PRODUCTION OF ACRYLIC ESTERS FROM β-CHLOROPROPIONIC ESTERS

Bernhard Jacobi and Hans Fikentscher, Ludwigshafen-on-the-Rhine, Germany, assignors to I. G. Farbenindustrie Aktiengesellschaft, Frankfort-on-the-Main, Germany No Drawing. Application January 5, 1931, Serial No. 506,750, and in Germany January 27, 1930

15 Claims. (Cl. 260—106)

The present invention relates to the production of acrylic esters from β-chloropropionic esters.

It has been proposed to prepare acrylic esters by treating β-chloropropionic esters with equimolecular proportions of basic agents of inorganic character but large quantities of the said agents are consumed in this process and the latter cannot be carried out continuously. These drawbacks particularly apply to a method of splitting off hydrogen halides from β-halogen propionic esters by heating with tertiary bases. For this purpose, however, stoichiometrical amounts of the bases are necessary so that the process cannot be utilized by reason of the high cost of the tertiary bases.

We have now found that hydrogen chloride may be split off from β-chloropropionic esters by means of an acid reacting, difficultly volatile substance containing an inorganic acid radicle as for example concentrated sulphuric acid, concentrated phosphoric acid, toluene sulphonic acid, zinc chloride or mixtures thereof, the acrylic esters being thus obtained in very good yields. The quantity of the acid reacting substance required is generally at least 5 per cent by weight of the ester and in most cases a quantity of about 10 per cent will give the best results. If the process be carried out continuously by distilling off the acrylic esters formed while adding fresh propionic ester the original quantity of acid reacting substance need not be replenished or only after an extended period of working. When working in the liquid phase the temperature of working depends on the boiling point of the propionic ester employed and on the prevailing pressure, the process being preferably carried out in vacuo so that the reaction may proceed also in this case at temperatures not substantially exceeding 200° C. if propionic esters with a very high boiling point be employed. If the reaction be carried out in the vaporous phase temperatures of the range between 150° and 250° C. are preferred but also somewhat higher or lower temperatures may be employed depending on the nature of the propionic ester and of the acid reacting substance employed.

The process according to the present invention is of special advantage because the direct esterification of acrylic acid is frequently difficult owing to the polymerization of the same which commences spontaneously, and when employing large amounts it is often dangerous. Moreover bad yields are obtained by the esterification.

The following examples will further illustrate the nature of this invention, but the invention is not restricted to these examples. The parts are by weight.

Example 1

10 parts of concentrated sulphuric acid are added to 100 parts of β-chloropropionic acid ethyl ester and then the mixture is subjected to distillation with the aid of a fractionating column. At from 95° to 100° C. a mixture of acrylic acid ethyl ester and hydrochloric acid passes over. It is preferable to separate the acrylic ester formed from the hydrochloric acid rapidly, as for example by washing with water in order to prevent a saponification and in particular to prevent a re-addition of hydrogen chloride. The yield of acrylic ester is about 65 parts and this represents from 85 to 90 per cent of the theoretical yield.

Example 2

100 parts of β-chloropropionic ethyl ester are mixed with 20 parts of pure phosphoric acid and the mixture is heated in an oil bath, heated to from 180° to 190° C. The acrylic acid ethyl ester formed distills off through a fractionating column at a temperature of from 95° to 100° C. Fresh β-chloropropionic ester is caused to flow into the reaction vessel at the rate at which the acrylic ester is distilled off, and in this manner the process is rendered continuous. In order to remove the hydrochloric acid, water is allowed to drop or is sprayed into the descending cooler.

Example 3

10 parts of zinc chloride (anhydrous) are added to 100 parts of β-chloropropionic ethyl ester and the whole is treated as described in Example 2. The yield amounts to about 55 parts of acrylic ester, which represents from 75 to 77 per cent of the theoretical yield.

Example 4

2 parts of granulated highly active charcoal are impregnated with 1 part of pure phosphoric acid mixed with 1 part of phosphorous pentoxide. The catalyst is filled into a tube and heated to about 200° to 240° C. Vapors of β-chloropropionic ethyl ester are allowed to flow continuously through the tube and the vapors issuing from the tube are passed from above through a cooled column which is rinsed with aqueous ammonia in order to prevent formation of the β-chloropropionic ester. After separating the ester from the aqueous solution and fractional distillation a yield of pure acrylic ester of about 80 per cent calculated on the β-chloropropionic ester employed is obtained; the remainders of chloropropionic ester are continuously returned to the reaction tube.

*Example 5*

10 parts of highly active charcoal are mixed with 5 parts of fused aqueous sodium silicate and dried by heating; the resulting mass is impregnated with a mixture of 3 parts of pure phosphoric acid, 1 part of barium oxide and 1 part of phosphorpentoxide. Vapors of β-chloropropionic methyl ester are allowed to flow over this catalyst in the manner described in Example 4. Methyl acrylic ester is obtained in a yield of about 80 per cent calculated on the β-chloropropionic ester employed.

What we claim is:—

1. In the production of alkyl esters of acrylic acid from β-chloropropionic esters, the step which comprises heating alkyl esters of beta-chloropropionic acid in the presence of a difficultly volatile acid reacting substance selected from the group consisting of difficultly volatile inorganic acids, aromatic hydrocarbon sulphonic acids and zinc chloride.

2. In the production of alkyl esters of acrylic acid from β-chloropropionic esters, the step which comprises distilling alkyl esters of beta-chloropropionic acid in the presence of a difficultly volatile inorganic acid reacting substance selected from the group consisting of difficultly volatile inorganic acids and zinc chloride.

3. In the production of alkyl esters of acrylic acid from β-chloropropionic esters, the step which comprises passing the vapors of alkyl esters of beta-chloropropionic acid over a difficultly volatile inorganic acid reacting substance selected from the group consisting of difficultly volatile inorganic acids and zinc chloride.

4. In the production of alkyl esters of acrylic acid from β-chloropropionic esters, the step which comprises heating alkyl esters of beta-chloropropionic acid in the presence of a difficultly volatile inorganic acid reacting substance selected from the group consisting of difficultly volatile inorganic acids and zinc chloride and washing the vapor of the acrylic ester formed with aqueous alkali.

5. In the production of alkyl esters of acrylic acid from β-chloropropionic esters, the step which comprises distilling alkyl esters of beta-chloropropionic acid in the presence of a difficultly volatile concentrated inorganic acid.

6. In the production of alkyl esters of acrylic acid from β-chloropropionic esters, the step which comprises distilling alkyl esters of beta-chloropropionic acid in the presence of concentrated sulphuric acid.

7. In the production of alkyl esters of acrylic acid from β-chloropropionic esters, the step which comprises distilling alkyl esters of beta-chloropropionic acid in the presence of pure phosphoric acid.

8. In the production of alkyl esters of acrylic acid from β-chloropropionic esters, the step which comprises distilling alkyl esters of beta-chloropropionic acid in the presence of zinc chloride.

9. In the production of alkyl esters of acrylic acid from β-chloropropionic esters, the step which comprises passing the vapors of alkyl esters of beta-chloropropionic acid over a mass comprising essentially highly active charcoal impregnated with pure phosphoric acid containing phosphorpentoxide.

10. In the production of alkyl esters of acrylic acid from β-chloropropionic esters, the step which comprises passing the vapors of alkyl esters of beta-chloropropionic acid over a dried mixture of highly active charcoal and sodium silicate impregnated with phosphoric acid containing phosphorpentoxide.

11. In the production of alkyl esters of acrylic acid from β-chloropropionic esters, the step which comprises passing the vapors of alkyl esters of beta-chloropropionic acid over a solid carrier impregnated with a difficultly volatile concentrated inorganic acid.

12. In the production of alkyl esters of acrylic acid from β-chloropropionic esters, the step which comprises passing the vapors of alkyl esters of beta-chloropropionic acid over a mass comprising essentially highly active charcoal impregnated with a difficultly volatile concentrated inorganic acid.

13. In the production of alkyl esters of acrylic acid from β-chloropropionic esters, the step which comprises passing the vapors of alkyl esters of beta-chloropropionic acid over a mass comprising essentially highly active charcoal impregnated with pure phosphoric acid.

14. In the production of alkyl esters of acrylic acid from β-chloropropionic esters the step which comprises passing the vapors of alkyl esters of beta-chloropropionic acid over highly active charcoal and sodium silicate impregnated with pure phosphoric acid containing phosphor pentoxide and barium oxide.

15. The process for the production of acrylic methyl ester from β-chloropropionic methyl ester which comprises passing the vapors of the beta-chloropropionic methyl ester over highly active charcoal and sodium silicate impregnated with pure phosphoric acid containing phosphor pentoxide and barium oxide.

BERNHARD JACOBI.
HANS FIKENTSCHER.